US005507243A

United States Patent [19]
Williams, Jr. et al.

[11] Patent Number: 5,507,243
[45] Date of Patent: Apr. 16, 1996

[54] CONNECTOR FOR UNDERWATER CABLES

[75] Inventors: Oneil J. Williams, Jr., Metairie; André W. Olivier, New Orleans, both of La.

[73] Assignee: The Laitram Corporation, Harahan, La.

[21] Appl. No.: 200,704

[22] Filed: Feb. 23, 1994

[51] Int. Cl.$^6$ .................................................. B63G 8/14
[52] U.S. Cl. ........................................ 114/245; 367/154
[58] Field of Search ................................ 114/243, 244, 114/245, 246; 367/19, 20, 154; 441/133

[56] References Cited

U.S. PATENT DOCUMENTS

| | | | |
|---|---|---|---|
| 3,648,642 | 3/1972 | Fetrow et al. | 114/245 |
| 3,931,608 | 1/1976 | Cole | 114/245 |
| 4,711,194 | 12/1987 | Fowler | 114/245 |
| 4,879,719 | 11/1989 | Dumestre, III | 114/249 |
| 5,214,612 | 5/1993 | Olivier et al. | 367/16 |

OTHER PUBLICATIONS

"Digicourse Seismic Systems"; 1990 DigiCOURSE, Inc. 3784-DC.

Primary Examiner—Jesus D. Sotelo
Attorney, Agent, or Firm—Leydig, Voit & Mayer

[57] ABSTRACT

A connector for attaching equipment to an underwater cable includes a cylindrical race having a plurality of sections pivotably connected by a hinge. The sections can pivot about the hinge to enable the race to be opened and detached from the cable. The hinge includes a plurality of sockets and a hinge pin rotatably received in the sockets. The hinge pin can preferably be retracted from the sockets to unlock the hinge and inserted into the sockets to lock the hinge. A retaining member prevents the hinge pin from falling out of the sockets when the hinge pin is retracted.

64 Claims, 7 Drawing Sheets

5,507,243

CONNECTOR FOR UNDERWATER CABLES

BACKGROUND OF THE INVENTION

1. Field of the Invention

This invention relates to a connector for connecting equipment to underwater cables, such as underwater cables used in seismic testing. More particularly, it relates to a connector which makes it possible for equipment to be readily attached and detached from an underwater cable by hand without the need for any tools.

2. Description of the Related Art

In marine seismic exploration, a cable, commonly referred to as a streamer cable, is towed underwater by a surface vessel. An array of hydrophones is mounted in the cable, and an acoustic source or gun is fired to force an impulse of compressed air into the water, creating a bubble. The collapse of the bubble generates acoustic pulses that radiate through the water and into the earth. Reflections of the pulses off geologic structures are picked up by the hydrophones, and data representing the detected reflections are transmitted to the surface vessel. By analyzing the reflections, it is possible to discover subsea formations of oil or gas.

It is desirable to accurately control the depth of the cable as it is being towed through the water. For this purpose, depth control mechanisms, commonly referred to as "cable-leveling birds", are attached to the cable at intervals along its length. The depth control mechanisms are equipped with adjustable diving planes, the angles of attack of which can be varied by motors in the depth control mechanisms so as to maintain the cable at a desired depth.

Each depth control mechanism is detachably connected to the cable by one or more collar-shaped connectors, which are semi-permanently attached to the cable. Attaching and detaching a depth control mechanism from a connector frequently entails the manipulation of one or more bolts or screws and requires the use of various tools such as a hex wrench or a screw driver. This makes the process of attaching and detaching the depth control mechanism time-consuming and difficult, especially on the deck of a rolling ship, and the difficulty increases with the severity of sea conditions. Often a damaged outer section of the connector must be replaced. Attachment screws must be removed to separate the outer section of the connector. The removal of screws and their reinsertion in a replacement outer section require the use of tools and take time. Furthermore, after the screws are removed, they can easily become lost and washed overboard. Once the depth control mechanism is detached from the cable, the cable with the collar-shaped connectors attached to it is typically wound up on a large reel. As layers of the cable accumulate on the reel, the connectors on the inner layers may be crushed against the cable, damaging the skin of the cable and/or the connector itself. Thus, conventional connectors for underwater cables have a number of problems with respect to ease of use.

SUMMARY OF THE INVENTION

Accordingly, it is an object of the present invention to provide a connector which enables equipment to be easily attached and detached from an underwater cable without the need for any tools.

It is another object of the present invention to provide a connector with no loose parts which can become lost.

It is yet another object of the present invention to provide a connector which can be removed from a cable while still attached to the equipment which it supports.

A connector for an underwater cable according to the present invention includes an inner race adapted for connection to a cable and an outer race rotatably mounted on the inner race. The outer race includes first and second sections pivotably connected by a hinge which enables the outer race to be opened by pivoting of the sections about the hinge, thereby allowing detachment of the outer race from the inner race. In a preferred embodiment, the two sections of the outer race are semicylindrical.

The outer race may also include a latch member for releasably latching the outer race to prevent the first and second sections from pivoting about the hinge. In a preferred embodiment, the latch member is a hinge having a retractable hinge pin.

In a preferred embodiment, the outer race has first and second hinges, with each hinge having a retractable hinge pin. The outer race can be opened by partially retracting either hinge pin from the corresponding hinge. Each hinge preferably includes a retaining member preventing the hinge pin from falling out of the hinge when it is partially retracted. When the hinge pins are fully inserted into the hinges, the sections of the outer race are held securely together.

The hinge pins are preferably of a quick release type such that they can be retracted from the hinges by hand without the need for any tools.

A connector according to the present invention is suitable for connecting a depth control mechanism to an underwater cable, but it is not restricted to use with a particular type of underwater equipment. For example, it can also be used to attach acoustic transceivers, flotation or ballasting equipment, or compass pods to an underwater cable. It can also be used to attach equipment to underwater cables other than those used in seismic exploration or to cables used outside of the water.

DESCRIPTION OF PREFERRED EMBODIMENTS

Figure 1:
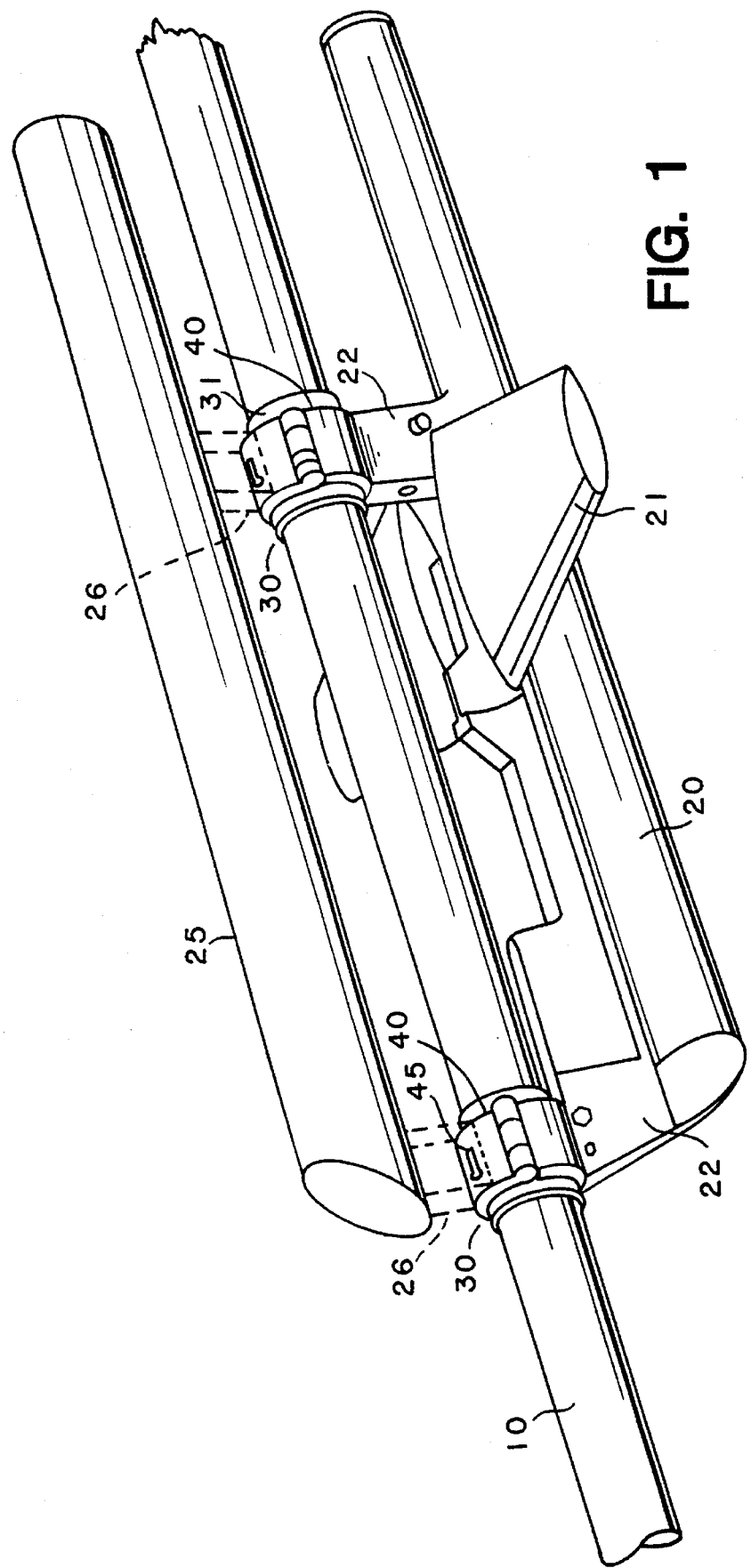
FIG. 1 is a perspective view of an embodiment of the present invention used in connecting a depth control mechanism to an underwater streamer cable.

FIG. 1 illustrates an embodiment of a connector 30 according to the present invention being used to connect one or more pieces of equipment in the form of a depth control mechanism 20 and a float tube 25 (just two examples of various types of equipment with which the present invention can be employed) to an underwater streamer cable 10. The cable 10 can be towed underwater to the left in the figure by an unillustrated surface vessel. Although FIG. 1 shows only a single depth control mechanism 20 and float tube 25, in actual practice, a plurality of depth control mechanisms 20 and other equipment, such as acoustic transceivers, are connected to the cable 10 at intervals along its length, which is sometimes up to several kilometers.

The depth control mechanism 20, which can be of conventional design, is equipped with adjustable diving planes 21, the angles of attack of which can be varied by an unillustrated motor housed inside the body of the depth control mechanism 20. Depth control mechanisms for use with underwater streamer cables are well-known to those skilled in the art, and the present invention is not restricted to use with any particular type. The depth control mechanism 20 also includes fore and aft pylons 22, each of which is detachably secured to a connector 30 of the present invention.

The float tube 25 is a sealed, hollow tube of PVC or the like which has positive buoyancy and is used to adjust the buoyancy of the cable 10. A float tube 25 may be attached to the cable 10 opposite a depth control mechanism 20 to provide buoyancy when the cable 10 is moving at low or zero speed and the lift generated by the depth control mechanism 20 is inadequate to overcome its weight. It may also be attached to the cable 10 opposite equipment such as an acoustic pod which generates no lift, or it may be attached to the cable 10 by itself between other pieces of equipment. The float tube 25 has fore and aft pylons 26, shown in phantom, which are detachably secured to the connectors 30 opposite from the pylons 22 of the depth control mechanism 20. Float tubes and their usage are well-known to those skilled in the art.

Each connector 30 has generally the shape of a cylinder surrounding the cable 10. The connectors 30 include a cylindrical inner collar, referred to as an inner race 31, which is clamped to the outer surface of the cable 10, and a cylindrical outer collar, referred to as an outer race 40, which surrounds the inner race 31 and can freely rotate about the inner race 31. Each pylon 22 and 26 is connected to one of the outer races 40 but not to the inner races 31. As a result, when the cable 10 is being towed through the water, the depth control mechanism 20 can hang beneath the cable 10 and the float tube 25 can float above the cable 10 without being affected by twisting of the cable 10.

Figure 2:
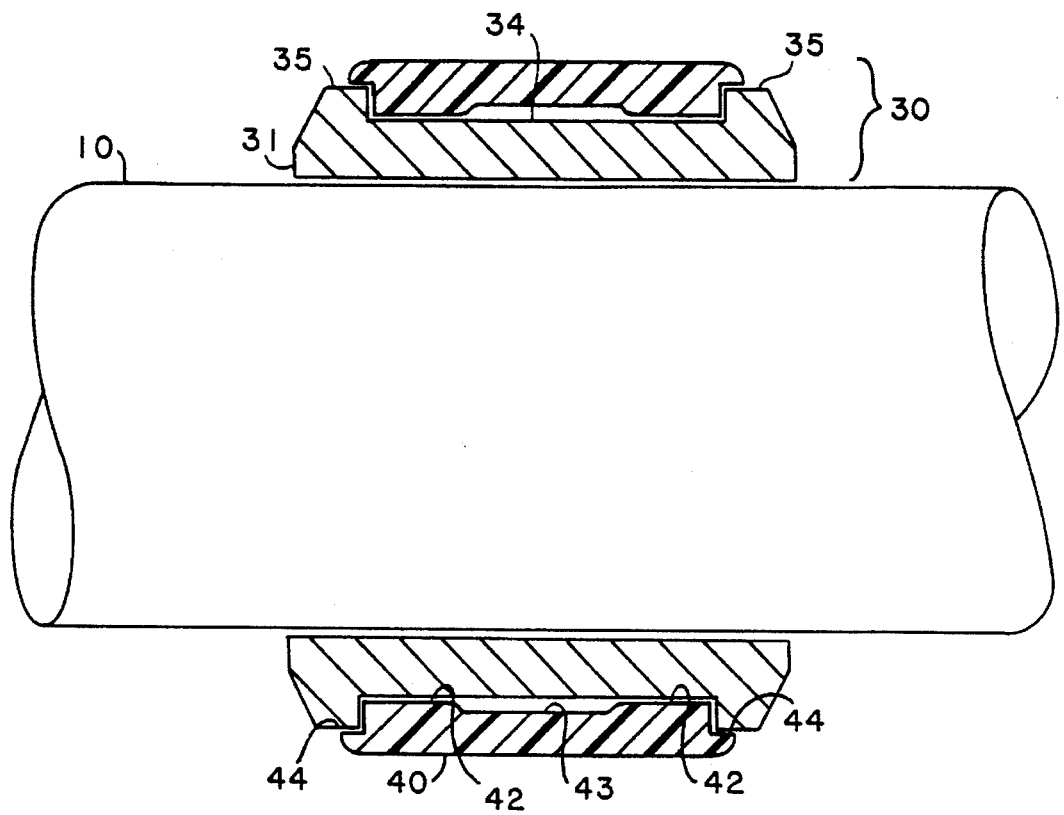
FIG. 2 is a longitudinal cross-sectional view of one of the connectors of FIG. 1.
Figure 3:
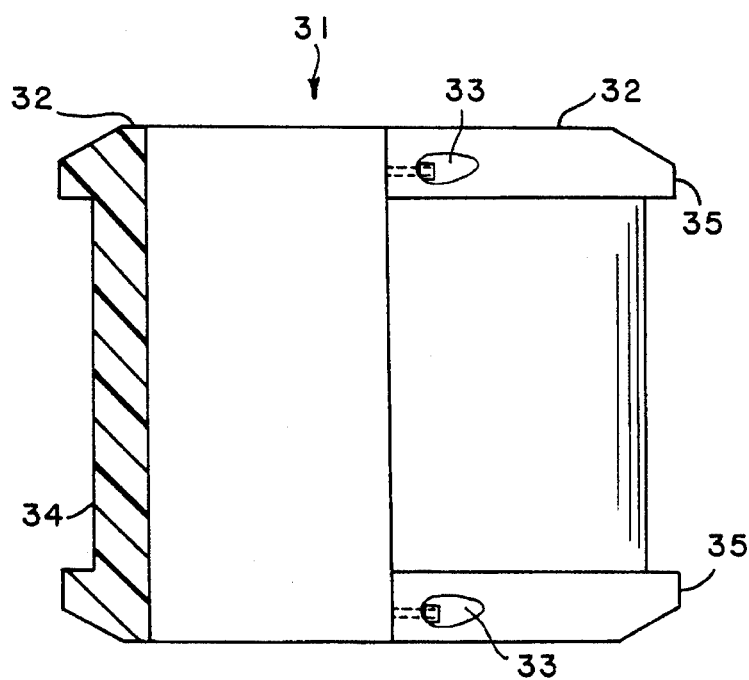
FIG. 3 is a partly cross-sectional elevation of the inner race of the connector of FIG. 2.

The inner race 31 can be identical in structure to the inner race of a conventional connector for an underwater cable. As shown in FIGS. 2 and 3, the inner race 31 comprises a plurality of arcuate sections which are combined to define a generally tubular shape with a cylindrical bore for receiving the cable 10. In the present embodiment, the inner race 31 comprises two semicylindrical sections 32 held together by screws 33 or other suitable means. The inner race 31 is connected to the cable 10 so as not to slide along the length of the cable 10 during use. For example, the inner race 31 can be cemented to the outer surface of the cable 10, or tape or other members may be attached to the cable 10 near the ends of the inner race 31 to define stops which prevent the inner race 31 from moving longitudinally along the cable 10 when subjected to drag forces. Alternatively, the inner diameter of the inner race 31 may be selected so that when the two sections 32 are combined, the cable 10 is tightly clamped between the sections 32 without the cable 10 being damaged.

On its outer periphery, the inner race 31 has a cylindrical bearing surface 34 for rotatably supporting the outer race 40. Two cylindrical flanges 35 each having a larger outer diameter than the bearing surface 34 are formed at the longitudinal ends of the bearing surface 34. The flanges 35 define stops which limit the axial movement of the outer race 40 when it is mounted on the inner race 31. While the flanges 35 need not have any specific shape, preferably they have no sharp corners on their outer peripheries which could catch against objects underwater.

Figure 4A:
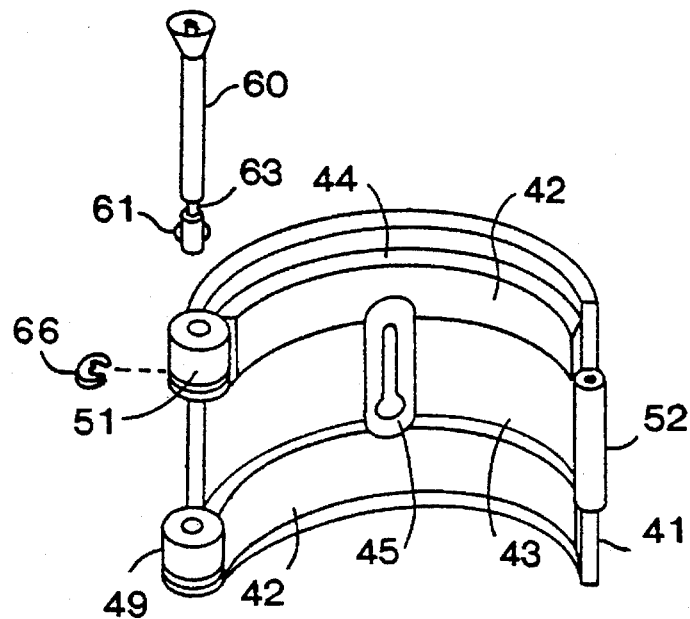
FIG. 4 is a perspective view of the outer race of the connector of FIG. 2 in a disassembled state.
Figure 4B:
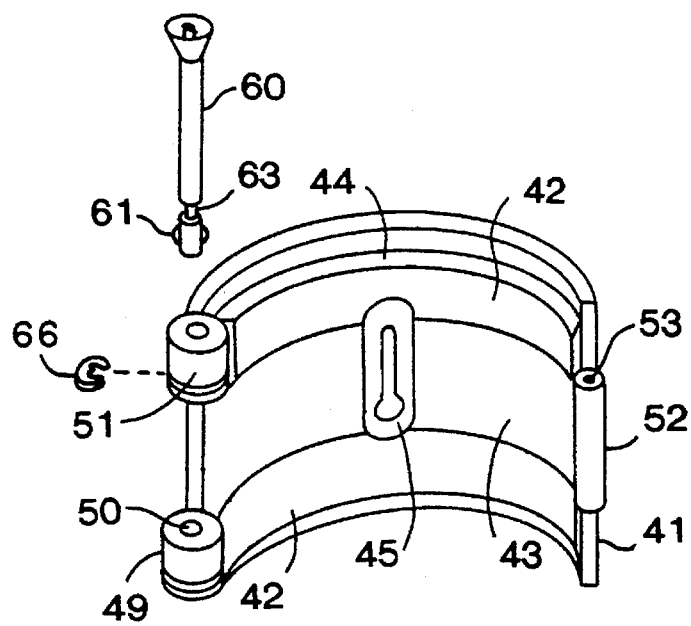
Figure 5:
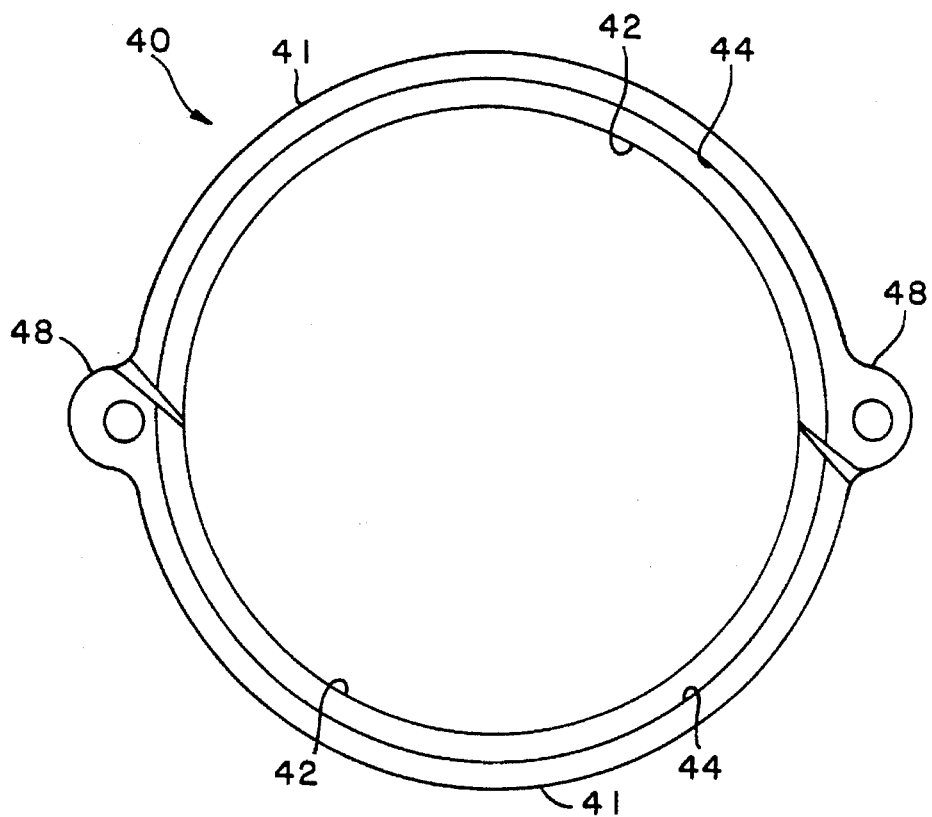
FIG. 5 is an end view of the outer race of FIG. 4 in an assembled state.

FIG. 4 illustrates the outer race 40 in a disassembled state. It comprises a plurality of arcuate sections connected together by one or more hinges 48 which enable the outer race 40 to be opened and closed. As described below, each hinge 48 can function either as a hinge about which the sections of the outer race 40 can pivot, or as a releasable latch member which can be latched to prevent relative movement of the sections or unlatched to allow the pivoting movement of the sections of the outer race 40. In this embodiment, the outer race 40 comprises two identical semicylindrical sections 41 which can be combined as shown in FIG. 5 to form a cylinder. Each section 41 has a pair of raised semicylindrical lands 42 extending between its lengthwise ends. The lands 42 are dimensioned so as to fit loosely around the bearing surface 34 of the inner race 31. The two lands 42 of each section 41 are separated by a semicylindrical recess 43. A circumferentially extending step 44 is formed in each section 41 on the widthwise outer side of each land 42. As shown in FIG. 2, when the outer race 40 is fit over the inner race 31, each step 44 overlaps in the axial direction one of the flanges 35 of the inner race 31 and helps to prevent dirt and other trash from entering between the bearing surface 34 of the inner race 31 and the lands 42 of the outer race 40, thus assuring that the two races 31 and 40 can smoothly rotate with respect to one another. However, for ease of manufacture, the steps 44 may be omitted.

The outer periphery of the outer race 40 need not be of any particular shape, but preferably it is without sharp corners which could increase flow resistance or easily catch on objects in the water. In the present embodiment, the outer surface of the outer race 40 is cylindrical.

Hinge sockets 49 and 52 are formed on the lengthwise ends of the sections 41. When the two sections 41 combine, the sockets interfit to define two diametrically opposed hinges 48. The number of sockets which are employed for each hinge 48 is not critical, and in the present embodiment, each hinge 48 includes three sockets. Two outer sockets 49 are formed on one end of each section 41 of the outer race 48 adjoining its widthwise sides, while an inner socket 52 is formed on the opposite end of the section 41 at approximately the widthwise center of the section 41. Axial bores 50 and 53 for receiving a hinge pin 60 are formed through the entire lengths of the outer sockets 49 and the inner sockets 52, respectively. When the two sections 41 are combined, the bores 50 in the outer sockets 49 of one section 41 align with the bore 53 of the inner socket 52 of the other section 41.

Each of the outer sockets 49 has an engaging portion in the form of an annular groove 51 extending from the outer surface of the socket 49 to its bore 50. A retaining member 66 such as an E-type retaining ring or a hairclip pin is housed in the groove 51 of either one of the outer sockets 49 of each section 41.

Figure 6:
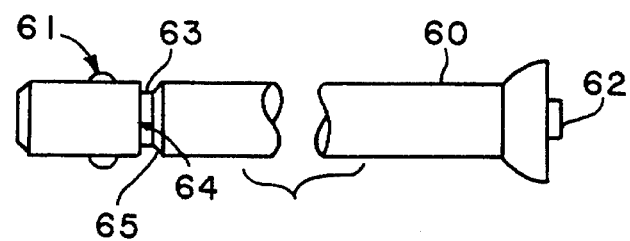
FIG. 6 is a plan view of one of the hinge pins of the outer race of FIG. 4.

The inner and outer sockets of the two hinges 48 of the outer race 40 are pivotably connected to one another by means of a retractable hinge pin 60, such as the one illustrated in FIG. 6. The hinge pins 60 employed in this embodiment are push-button quick release pins. Each hinge pin 60 has a detent mechanism comprising a pair of spring-loaded detent balls 61 disposed near one end and biased in the radially outward direction of the pin 60. The detent balls 61 are intended to engage with the groove 51 of the outer socket 49 not containing the retaining member 66. The detent balls 61 can be retracted radially inward by manually depressing a button 62 installed on the other end of the pin 60. Quick release pins which have a detent mechanism of this type and which can be modified in accordance with the present invention are commercially available from various sources, such as McMaster-Carr Corporation of Chicago, Ill.

A circumferential groove 63 extends around the entire outer periphery of the pin 60 between the detent balls 61 and the button 62 and in the vicinity of the detent balls 61. The groove 63 has a first wall 64 formed in a plane substantially perpendicular to the axis of the pin 60, and a second wall 65 which slopes away from the first wall 64. The groove 63 is intended to engage with one of the retaining members 66. The second wall 65 can have any shape which enables the retaining member 66 to disengage from the groove 63 by sliding along the second wall 65. In this embodiment, the second wall 65 is frustoconical with a constant slope, but it can also have a curved slope, for example.

The connector 30 can be made of any materials having a strength and corrosion resistance suitable for an underwater environment. Examples of suitable materials for the inner and outer races include plastics such as amorphous resins and PVC, and metals such as stainless steel or cast aluminum. Commercially available quick release pins suitable for use as the hinge pins 60 are frequently made from stainless steel.

The inner and outer races 31 and 40 of this embodiment are each formed from two semicylindrical sections. However, each race can include a larger number of sections. Accordingly, the outer races 40 need not have two hinges 48. For example, the outer race 40 could comprise three arcuate sections connected to one another by three hinges.

Figure 7:
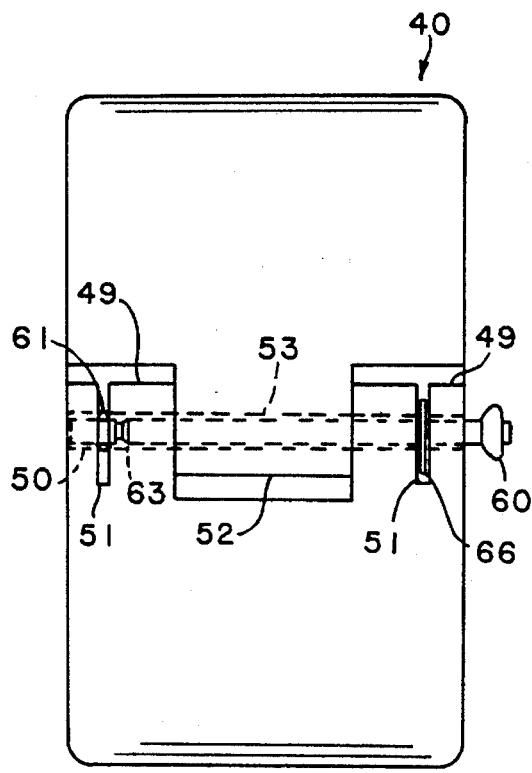
FIG. 7 is a side view of the outer race in a locked state.

FIG. 7 illustrates the outer race 40 in an assembled and locked state. In this state, the bores of the inner and outer sockets of adjoining sections 41 are aligned, and each hinge pin 60 is inserted into the aligned bores of a hinge 48 until the detent balls 61 engage the groove 51 in one of the outer sockets 49. Once the detent balls 61 and the groove 51 are engaged, the outward biasing force exerted on the detent balls 61 by the biasing spring of the hinge pin 60 is sufficiently strong that the hinge pin 60 will not be forced out of the hinge sockets by forces encountered during underwater operation of the connector 30.

When the outer race 40 is installed on a cable 10, the hinge pin 60 is preferably oriented such that the end equipped with the button 62, which protrudes to the outside of the outer race 40, is on the aft side of the outer race 40 to prevent fishing lines, seaweed, or other trash from catching on the hinge pin 60. For the same reason, the length of the hinge pin 60 is preferably such that the end opposite the button 62 does not project from the forward side of the outer race 40.

Figure 8:
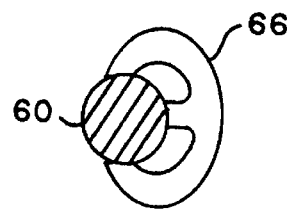
FIG. 8 is a cross-sectional view showing the relationship between the retaining member and the hinge pin in the state shown in FIG. 7.

The retaining member 66 disposed inside the groove 51 of the other outer socket 49 of each hinge 48 surrounds the hinge pin 60 and engages a portion of the hinge pin 60 outside the groove 63. FIG. 8 illustrates the retaining member 66 when the outer race 40 is in the locked state. Although the retaining member 66 is frictionally engaged with the hinge pin 60, the outer surface of the hinge pin 60 is sufficiently smooth that the retaining member 66 does not prevent the axial movement of the hinge pin 60.

When it is desired to open the outer race 40, the button 62 of the hinge pin 60 is depressed to retract the detent balls 61 inward and disengage them from the groove 51. With the detent balls 61 retracted, the hinge pin 60 can be moved to the right in FIG. 9 until the groove 63 in the hinge pin 60 is aligned with the groove 51 in the outer socket 49 containing the retaining member 66, upon which the retaining member 66 engages with the groove 63 in the hinge pin 60. The hinge pin 60 at the time of engagement is shown in cross section in FIG. 10. The first wall 64 of the groove 63 is shaped so that it abuts against the side of the retaining member 66, and further outward movement, i.e., rightward movement of the hinge pin 60 is prevented by the retaining member 66. In this state, the left end of the hinge pin 60 is located outside of the inner socket 52, so the inner and outer sockets of the illustrated hinge 48 can separate to allow the outer race 40 to be opened. At this time, the hinge pin 60 of the other hinge 48 on the opposite side of the outer race 40 remains in its locked position, so as the outer race 40 is opened, the sections 41 pivot about the other hinge pin 60.

Figure 9:
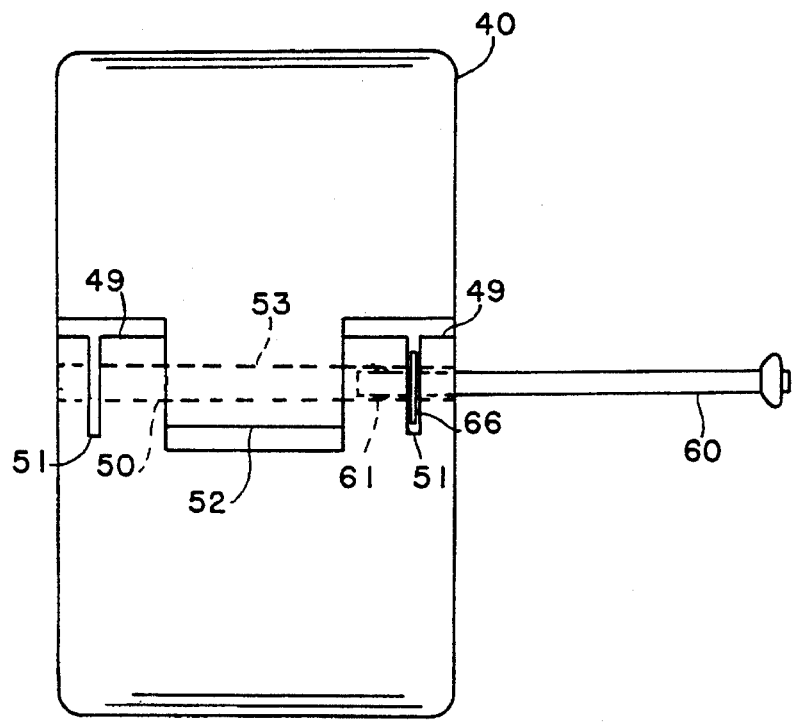
FIG. 9 is a side of the outer race in an unlocked state.
Figure 10:
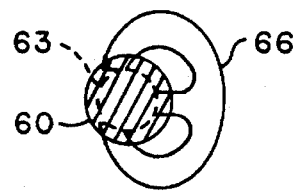
FIG. 10 is a cross-sectional view showing the relationship between the retaining member and the hinge pin in the state shown in FIG. 9.

When the outer race 40 is closed, it can be relocked by pushing the hinge pin 60 to the left in FIG. 9 until it returns to the position shown in FIG. 7 and the detent balls 61 once again engage with the groove 51 in one of the outer sockets 49. Since the second wall 65 of the groove 63 in the hinge pin 60 is sloped, as the hinge pin 60 is pushed to the left in FIG. 9, the retaining member 66 can ride up the second wall 65 and out of the groove 63. Thus, the groove 63 and the retaining member 66 prevent movement of the hinge pin 60 in a single direction. Namely, they prevent complete retraction of the hinge pin 60 from the outer race 40 but do not prevent insertion.

It can be seen that either hinge 48 can function as a hinge about which the two sections 41 of the outer race 40 can pivot, or it can serve as a releasable latch member for locking and unlocking the two sections 41 from one another to prevent or allow them to pivot with respect to each other while the other hinge 48 functions as a hinge. Since the two hinges 48 are identical in structure, which one is used as a latch member and which one is used as a hinge can be decided by the user of the connector 30 in accordance with his convenience.

The hinge pin 60 is not restricted to any particular type, and any pin having detent members which can be controllably engaged and disengaged from the grooves 51 in the outer sockets 49 can be employed. The grooves 51 need not extend to the outer surface of the outer sockets 49. For example, the grooves 51 which receive the detent balls 61 could be replaced by a recess formed in the bores 50 of the outer sockets 49 and not extending to the outside of the sockets 49. However, grooves 51 extending between the inner and outer surfaces of the outer sockets 49 are advantageous in that they are easy to form and make it easy to install the retaining members 66.

The outer race 40 can be connected to the depth control mechanism 20 and the float tube 25 by any means which does not interfere with the relative rotation of the inner and outer races and which can withstand the forces applied to devices 20 and 25 during use. In the present embodiment, the depth control mechanism 20 is releasably connected to the outer race 40 by engagement between a slot formed in the outer race 40 and a coupling device on the depth control mechanism 20. As shown in FIG. 4, each of the sections 41 of the outer race 40 has a keyhole-shaped slot 45 formed therein with an axis extending in the axial direction of the outer race 40. If the outer race 40 is to be connected to only a single piece of equipment, such as a depth control mechanism 20, a single slot 45 is sufficient. However, in this embodiment each section 41 of the outer race 40 has its own slot 45 so that the two sections 41 are identical in structure and can be used interchangeably and so that the outer race 40 can be connected to more than one piece of equipment at a time. Each slot 45 has a generally straight portion 46 and a generally circular enlarged portion 47 having a diameter greater than the width of the straight portion 46. Each slot 45 opens onto the outer peripheral surface of the outer race 40, i.e., the surface facing away from the inner race 31. While it is not necessary for the slot 45 to extend to the inner peripheral surface of the outer race 40, for ease of manufacture, it is generally simpler to form the slots 45 as through holes extending through the thickness of each section 41 of the outer race 40. When the outer race 40 is mounted on a cable 10, the straight portion 46 of the slot 45 is preferably disposed aft of the enlarged portion 47.

Figure 11:
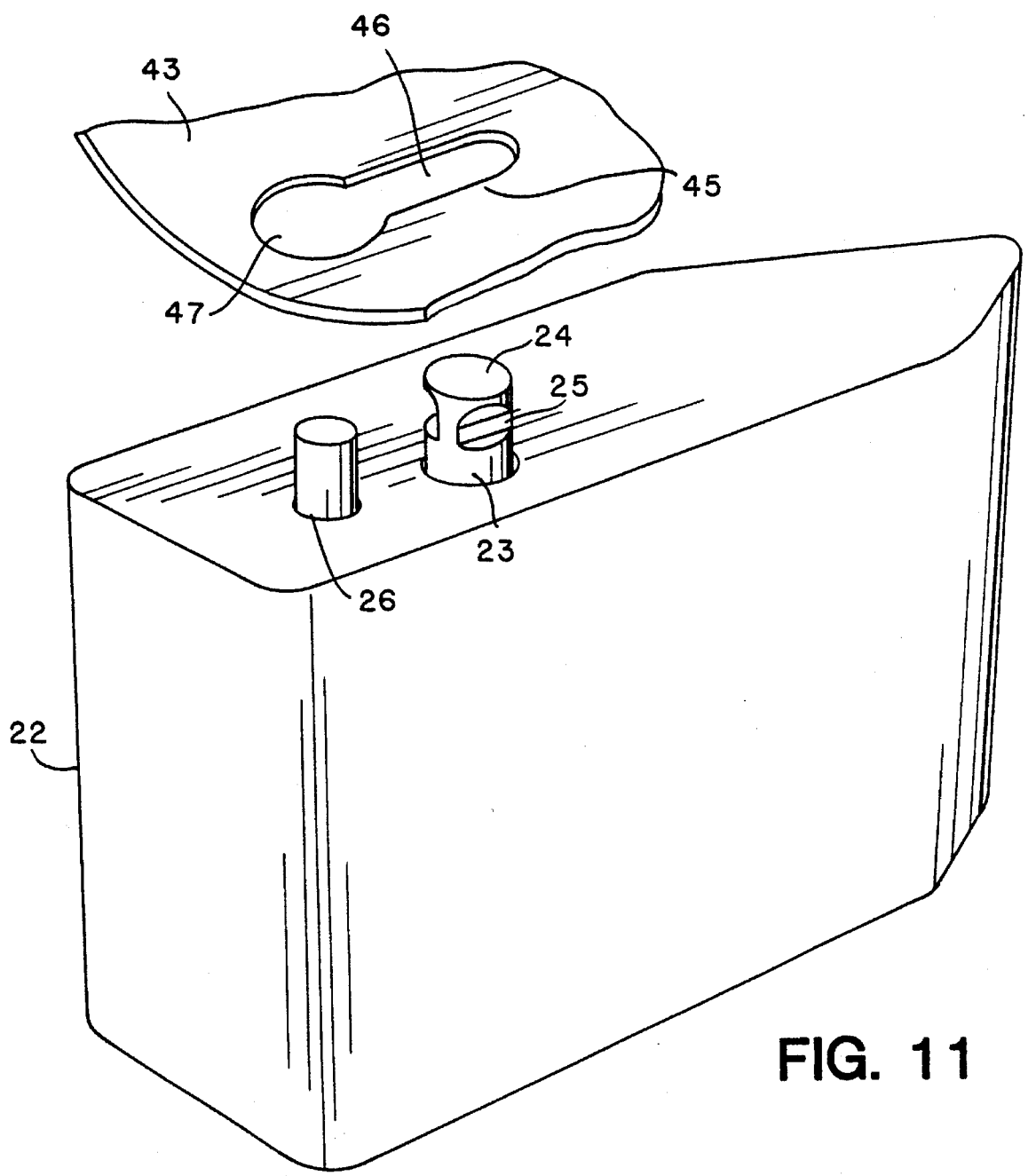
FIG. 11 is a perspective view showing a typical arrangement for connecting the depth control mechanism to the outer race of the connector.

As schematically shown in FIG. 11, the upper end of each pylon 22 of the depth control mechanism 20 is equipped with a coupling device of a well-known design. The coupling device includes first and second pins 23 and 26 which engage with one of the slots 45 in the outer race 40. The first pin 23 has a head 24 having a diameter smaller than the diameter of the enlarged portion 47 of the slot 45 but larger than the width of the straight portion 46 of the slot 45. Notches 25 capable of engaging with the sides of the straight portion 46 of the slot 45 are formed in the first pin 23 beneath its head 24. The first pin 23 can be inserted into the enlarged portion 47 of the slot 45 and then moved in the axial direction of the slot 45 away from the enlarged portion 47 to engage the notches 25 with the straight portion 46 of the slot 45. Once the notches 25 are engaged with the straight portion 46, the first pin 23 can not be removed from the slot 45 without first sliding the first pin 23 back to the enlarged portion 47. The second pin 26 is spring biased away from the upper end of the pylon 22. When the first pin 23 has been inserted into the enlarged portion 47 and then slid into the straight portion 46 of the slot 45, the second pin 26 pops into the enlarged portion 47 of the slot 45 and prevents the first pin 23 from coming out of the slot 45. The second pin 26 can be retracted from the slot 45 by an unillustrated operating lever to enable the first pin 23 to be withdrawn from the slot 45 when desired. The illustrated coupling device is the same as that described in detail in U.S. Pat. No. 5,214,612, and other features of the structure of the coupling device can be found by reference to that patent. However, a variety of coupling devices for connecting equipment to a keyhole-shaped slot in an outer race of a connector are widely known, and any of those known devices can be employed in the present invention. The pylons 26 of the float tube 25 can be connected to the outer races 40 by means of a similar structure.

While the embodiment of FIG. 1 employs a conventional slot and pin-type arrangement for connecting the depth control mechanism 20 and the float tube 25 to the outer race 40 of each connector 30, other means can be employed. With a conventional connector, the outer race is not readily detachable from the inner race, so it is important that equipment such as the depth control mechanism 20 and the float tube 25 be readily detachable from the outer race. However, in the present invention, since the outer race 40 can be readily detached from the inner race 31, it is not important that the depth control mechanism 20 or the float tube 25 be readily detachable from the outer race 40. Therefore, in the present invention, coupling devices less complicated and easier to manufacture than that shown in FIG. 11 can be used to connect the depth control mechanism 20 and the float tube 25 to the outer race 40. For example, the outer race 40 can be connected to the depth control mechanism 20 and the float tube 25 by screws or bolts.

When the depth control mechanism 20 or the float tube 25 needs to be removed from the cable 10 aboard the deck of a ship, an operator can release the outer race 40 of each connector 30 by retracting one of the hinge pins 60 of each outer race 40. Since both hinge pins 60 of each connector 30 are retractable, it is easy for an operator to open the outer races 40, regardless of which side of the cable 10 he is standing on. Once the hinge pins 60 are retracted, the outer races 40 can be opened and the depth control mechanism 20 and the float tube 25 detached from the cable 10. At this time, the retracted hinge pins 60 are still attached to the outer races 40 by the retaining members 66 in the grooves 51 of the outer races 40, so there is no danger of the hinge pins 60 coming loose and being lost. In addition, when the outer races 40 are removed from the inner races 31, they can remain attached to the depth control mechanism 20 and the float tube 25, so there is no danger of the outer races 40 falling off and rolling around the deck of the ship. Attachment and removal of the outer race 40 can be performed by hand without the need for any tools, resulting not only in earlier installation but less risk of tools being washed overboard.

With a conventional arrangement, the depth control mechanism 20 and the float tube 25 would have to be individually removed from a connector in order to detach them from a cable. However, in the present embodiment, both devices 20 and 25 can be simultaneously detached from the cable 10 in a single operation, increasing the speed of operation. In the past, it was necessary to stop the cable in order to detach equipment from it, but the outer race 40 of a connector 30 according to the present invention along with equipment 20 and 25 attached thereto can be detached from a moving cable 10 as it is being reeled in.

Instead of using retaining members 66, it is possible to employ engagement between the detent balls 61 and one of the grooves 51 in the outer sockets 49 to prevent the hinge pins 60 from falling out of the sockets when the hinge pins 60 are in a retracted state. Alternatively, a chain, string, or similar device could be attached between each hinge pin 60 and the corresponding outer race 40 and function as a retaining member to prevent the hinge pin 60 from becoming lost.

Prior to using the cable 10 aboard ship, the inner races 31 are mounted on the cable 10 at suitable intervals, and then the cable 10 is coiled for storage. The outer races 40 are attached to the equipment which is to be towed by the cable 10. When the cable 10 is deployed, it is uncoiled, and as it is fed overboard, the outer races 40 attached to the equipment to be towed are locked around the corresponding inner races 31. When the cable 10 is reeled back in, the equipment being towed and the outer races 40 are together detached from the inner races 31, and the cable 10 is again coiled. With a conventional connector, both the inner race and the outer race remain attached to the cable 10 when it is coiled.

However, in the present invention, the outer race 40 is removed from the cable 10 along with the equipment being towed by the cable 10, leaving only the inner race 31 attached to the cable 10. Therefore, a cable 10 employing a connector according to the present invention is easier to coil and store. Furthermore, when the outer races 40 are removed, they are less subject to damage than if the cable 10 were coiled with the outer races 40 still attached. In addition, there is less possibility of damage by the connectors 30 to the skin of the cable 10 during coiling if the outer races 40 are first removed.

It is generally desirable for the depth control mechanism 20 and the float tube 25 to be able to freely rotate with respect to the cable 10, so the connector 30 will usually include an inner race 31 to provide a smooth bearing surface for the outer race 40. However, if the equipment being towed is not of a type that needs to be able to rotate about the cable 10, the inner race 31 can be dispensed with, and the outer race 40 can be installed directly on the cable 10.

Since the illustrated embodiment employs a conventional arrangement for connecting the outer race 40 to equipment being towed, a conventional underwater cable connector can be easily retrofit to obtain a connector according to the present invention by replacing the outer race of an existing cable connector with an outer race like that of the illustrated embodiment.

It is not necessary that both of the hinges 48 have an easily retractable hinge pin 60. For example, as long as the hinge pin of one hinge 48 is retractable to enable that hinge 48 to function as a latch member, the hinge pin of the other hinge 48 may be of a type requiring use of a tool to remove it from the hinge 48. Furthermore, as long as the outer race 40 includes at least one hinge, the other hinge can be replaced by a latching member of a type which does not function as a hinge.

Figure 12:
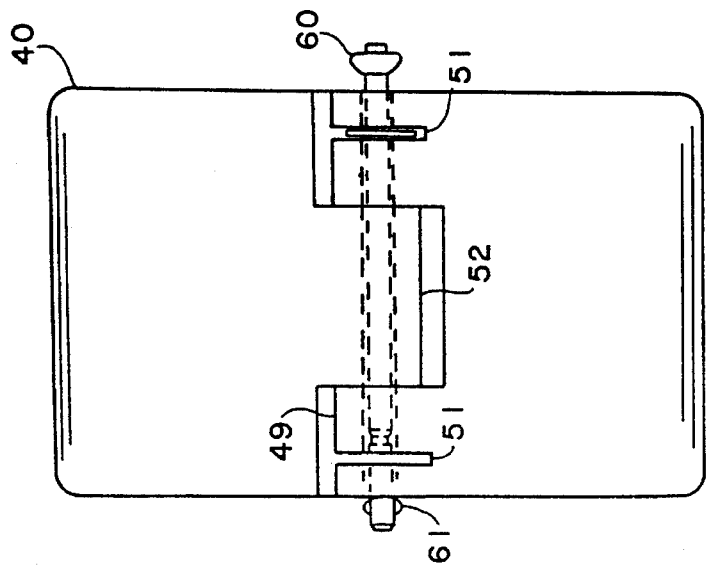

The detent balls 61 of the hinge pin 60 need not be engaged with one of the grooves 51 when the outer race 40 is in a locked state, and may engage with any portion of the outer race 40 such that the axial movement of the hinge pin 60 is prevented. For example, FIG. 12 shows the outer race 40 of an embodiment in which the detent balls 61 engage with an exterior surface of the outer race 40 when the outer race 40 is in a locked state. In this case, it is possible to omit the lefthand groove 51 in the figure. This embodiment is otherwise identical to the preceding embodiment.

Figure 13:
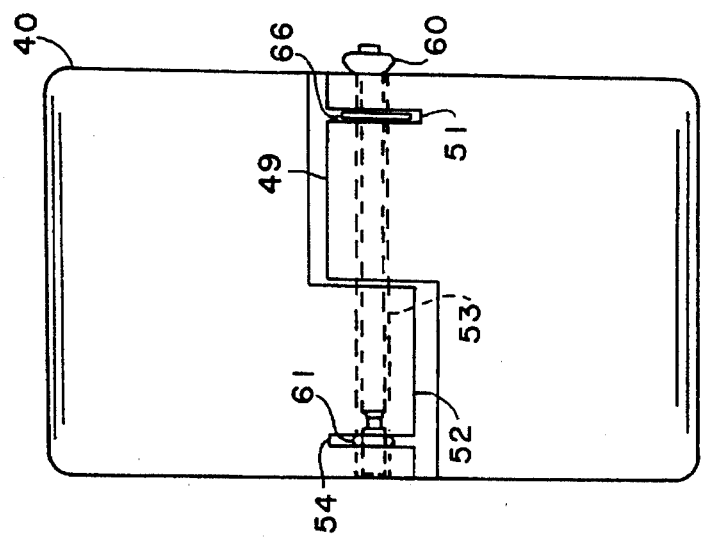

As mentioned above, the hinges 48 of the outer race 40 are not restricted to having a certain number of sockets. FIG. 13 illustrates the outer race 40 of an embodiment in which each hinge has two sockets 49 and 52, while FIG. 14 illustrates the outer race 40 of an embodiment in which each hinge has four sockets 49 and 52.

In the embodiment of FIG. 13, one socket 49 of each hinge has a groove 51 which houses a retaining member 66, while the other socket 52 of the hinge has a similar groove 54 which engages with the detent balls 61 of a hinge pin 60. Groove 54 preferably extends from the external surface of socket 52 to the bore 53 of the socket 52. The outer race 40 is shown in a locked state in FIG. 13. In order to unlock the outer race 40, the hinge pin 60 is retracted, i.e., moved to the right in the figure until its left end is withdrawn from socket 52.

Figure 14:
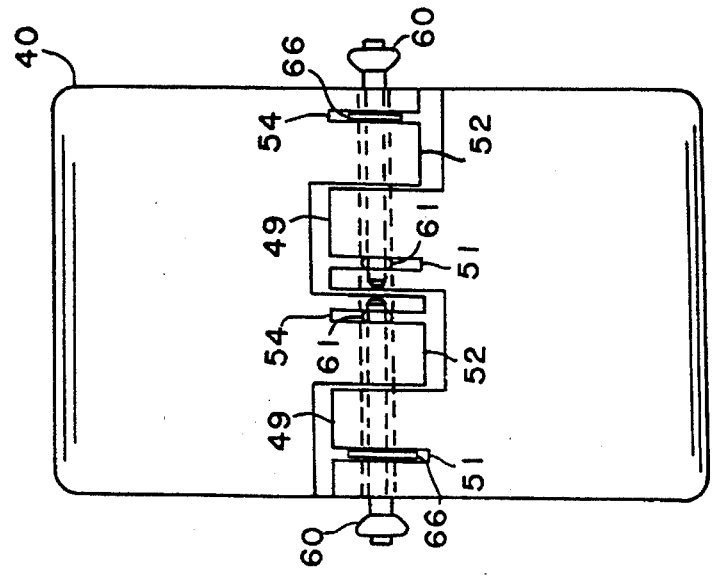
FIGS. 12–14 are side views of the outer races of additional embodiments of the present invention.

In the embodiment of FIG. 14, one section of the outer race 40 has two sockets 49, while the other section of the outer race 40 has two sockets 52 which interfit with sockets 49. A groove 51 is formed in each of sockets 49, and a similar groove 54 is formed in each of sockets 52. Each groove 51 and 54 preferably extends between the external surface of the socket and the inside of the bore of the socket. A single hinge pin may be used to link all four sockets, or as shown in FIG. 14, two hinge pins 60 can be inserted into the sockets from opposite axial ends of the outer race 40. Use of a pair of hinge pins 60 may be advantageous when the axial length of the outer race 40 is particularly large so that a single, long hinge pin 60 would be expensive to manufacture. The grooves 51 and 54 of the inner pair of sockets (the sockets spaced from the axial ends of the outer race 40) engage with the detent balls 61 of the hinge pins 60 when the outer race 40 is in a locked state, while the grooves 51 and 54 of the outer pair of sockets (the sockets adjoining the axial ends of the outer race 40) house retaining members 66. In order to unlock the outer race 40, both hinge pins 60 are retracted in opposite axial directions so that their opposing ends are withdrawn from the inner pair of sockets.

The embodiments of FIGS. 13 and 14 provide the same advantages as the embodiment of FIG. 7.

What is claimed is:

1. A connector for connecting equipment to an underwater cable comprising:

a cylindrical inner race having a bore for receiving an underwater cable; and an outer race rotatably mounted around the inner race and comprising first and second sections, a first hinge pivotably connecting the first and second sections, and a second hinge pivotably connecting the first and second sections and spaced from the first hinge in a circumferential direction of the outer race.

2. A connector according to claim 1 wherein the first hinge has an axis parallel to a longitudinal axis of the outer race.

3. A connector according to claim 1 wherein the first and second sections of the outer race are semicylindrical.

4. A connector according to claim 1 wherein each hinge comprises first and second sockets and a releasable hinge pin including a detent mechanism for releasably engaging the hinge pin with one of the sockets.

5. A connector according to claim 1 wherein the outer race includes means for connecting the outer race to equipment to be towed by the cable.

6. A connector according to claim 5 wherein the connecting means comprises a keyhole-shaped slot formed in the outer race.

7. A connector according to claim 1 wherein:

the inner race includes a cylindrical bearing surface formed on an outer periphery of the inner race; and the outer race includes two cylindrical lands formed on an inner periphery of the outer race opposing the bearing surface and a cylindrical recess formed in the inner periphery of the outer race between the lands.

8. A connector according to claim 7 wherein the inner race includes flanges on its outer periphery adjoining the bearing surface, and the outer race overlaps one of the flanges in an axial direction of the connector.

9. A connector according to claim 1 wherein the first hinge comprises a releasable hinge pin including a detent mechanism releasably engageable with one of the sections and wherein the hinge pin is movable between a locked position in which the hinge pin engages the first and second sections and a retracted position in which the hinge pin is withdrawn from one of the sections, the detent mechanism being operable to prevent and allow movement of the hinge pin.

10. A connector according to claim 9 wherein the first hinge includes a retaining member engageable with the hinge pin to prevent complete detachment of the hinge pin when the hinge pin is in its retracted position.

11. A connector according to claim 10 wherein the detent mechanism comprises a detent ball movable between a protruding position and a retracted position and an operating mechanism for moving the detent ball to its retracted position and wherein one of the sections includes a surface extending generally transversely with respect to an axis of the hinge pin, the detent ball engaging the transverse surface when the hinge pin is in its locked position.

12. A connector according to claim 11 wherein the hinge pin includes a surface extending generally transversely with respect to the axis of the hinge pin, the retaining member abutting the transverse surface of the hinge pin when the hinge pin is in its retracted position.

13. A connector according to claim 12 wherein the retaining member comprises a ring surrounding the hinge pin.

14. A connector for connecting equipment to an underwater cable comprising:

a cylindrical inner race having a bore for receiving an underwater cable; and an outer race rotatably mounted around the inner race and comprising first and second sections and a first hinge pivotably connecting the first and second sections, the first hinge comprising first and second sockets and a releasable hinge pin including a detent mechanism for releasably engaging the hinge pin with one of the sockets.

15. A connector according to claim 14 wherein:

the first socket is connected to the first section;

the second socket is connected to the second section; and the hinge pin is axially movable between a locked position in which the hinge pin engages the first and second sockets and a retracted position in which the hinge pin is withdrawn from the second socket, and the detent mechanism is operable to engage and disengage from the second socket to prevent and allow axial movement of the hinge pin.

16. A connector according to claim 15 wherein the detent mechanism comprises a detent ball radially movable between a protruding position and a retracted position and an operating mechanism for moving the detent ball to its retracted position to disengage the detent ball from the second socket.

17. A connector according to claim 15 wherein the second socket includes a portion lockingly engaging the detent mechanism when the hinge pin is in its locked position.

18. A connector according to claim 15 wherein the first hinge includes a retaining member enabling the hinge pin to move axially between its retracted and locked positions and preventing complete detachment of the hinge pin when the hinge pin is in its retracted position.

19. A connector according to claim 18 wherein the hinge pin has a surface formed in an outer periphery thereof, and the retaining member engages with the surface when the hinge pin is in its retracted position.

20. A connector according to claim 19 wherein the detent mechanism includes a detent ball moveable between a protruding position and a retracted position and an operating mechanism for moving the detent ball to its retracted position to disengage the detent ball from the second socket.

21. A connector according to claim 20 wherein the retaining member comprises a ring surrounding the hinge pin.

22. A connector according to claim 14 wherein the hinge pin comprises a quick release pin.

23. A device for connection to an underwater cable comprising:

equipment for use in underwater exploration; and a first collar secured to the equipment for connecting the equipment to an underwater cable, the first collar comprising first and second sections, a hinge pivotably connecting the first and second sections, and a latch mechanism operable to allow and prevent pivoting of the first and second sections about the hinge, the latch mechanism including a pin movable in an axial direction of the collar between a latched and an unlatched position.

24. A device according to claim 23 including a second collar adapted for mounting on an underwater cable, the first collar being rotatably mounted about the second collar.

25. A device according to claim 23 wherein the equipment comprises a depth control mechanism having an adjustable diving plane.

26. A device according to claim 23 wherein the equipment comprises a float tube having positive buoyancy.

27. A device according to claim 23 wherein the collar is removably secured to the equipment.

28. A device according to claim 23 wherein the equipment includes a pylon secured to the first section of the first collar.

29. A device according to claim 28 wherein the pylon is removably secured to the first section.

30. A connector according to claim 23 wherein the latch member comprises a releasable pin including a detent mechanism releasably engageable with one of the sections and wherein the pin is moveable between a locked position in which the pin engages the first and second sections and a retracted position in which the pin is withdrawn from one of the sections, the detent mechanism being operable to prevent and allow movement of the pin.

31. A connector according to claim 30 wherein the latch mechanism includes a retaining member engageable with the pin to prevent complete detachment of the pin when the pin is in its retracted position.

32. A connector according to claim 31 wherein the detent mechanism comprises a detent ball moveable between a protruding position and a retracted position and an operating mechanism for moving the detent ball to its retracted position and wherein one of the sections includes a surface extending generally transversely with respect to an axis of the pin, the detent ball engaging the transverse surface when the pin is in its locked position.

33. A connector according to claim 32 wherein the pin includes a surface extending generally transversely with respect to the axis of the pin, the retaining member abutting the transverse surface of the pin when the pin is in its retracted position.

34. A connector according to claim 33 wherein the retaining member comprises a ring surrounding the pin.

35. A connector for connecting equipment to an underwater cable comprising:

a cylindrical inner race; and an outer race rotatably mounted about the inner race and comprising a first section, a second section, a first hinge pivotably connecting the first and second sections, and a latch mechanism operable to allow and prevent pivoting of the first and second sections about the first hinge, the latch mechanism including a latching portion movable in an axial direction of the outer race to latch and unlatch the latch mechanism.

36. A connector according to claim 35 wherein the latch mechanism comprises a second hinge spaced from the first hinge in a circumferential direction of the outer race and having a retractable hinge pin.

37. A connector according to claim 35 wherein the latching portion comprises a retractable pin movable between a latched and an unlatched position.

13

38. A connector according to claim 37 wherein the latch pin includes a detent mechanism for maintaining the pin in the latched position.

39. A connector according to claim 38 wherein the latch mechanism includes a retaining member engageable with the latch pin to prevent complete detachment of the latch pin when the latch pin is in its unlatched position.

40. A connector according to claim 39 wherein the detent mechanism comprises a detent ball movable between a protruding position and a retracted position and an operating mechanism for moving the detent ball to its retracted position and wherein one of the sections includes a surface extending transversely with respect to an axis of the latch pin, the detent ball engaging with the transverse surface when the latch pin is in its latched position.

41. A connector according to claim 40 wherein the latch pin includes a surface extending generally transversely with respect to the axis of the latch pin, the retaining member abutting the transverse surface of the latch pin when the latch pin is in its unlatched position.

42. A connector according to claim 41 wherein the retaining member comprises a ring surrounding the latch pin.

43. A connector according to claim 35 wherein the latch mechanism comprises first and second sockets, and the latching portion comprises a releasable hinge pin including a detent mechanism for releasably engaging the hinge pin with one of the sockets.

44. A connector for connecting equipment to an underwater cable comprising:

an inner race having an outer periphery; and an outer race rotatable about the outer periphery of the inner race and comprising first and second sections, a connecting member connecting the sections, the connecting member movable in an axial direction of the outer rail between a latched position in which the sections are secured to one another and an unlatched position in which the sections can move with respect to one another to enable the outer race to be detached from the inner race, and a retaining member preventing the connecting member from being detached from one of the sections when the connecting member is in its unlatched position.

45. A connector according to claim 44 wherein the connecting member comprises a releasable pin including a detent mechanism releasably engageable with one of the sections and wherein the pin is moveable between the latched position in which the pin engages the first and second sections and the unlatched position in which the pin is withdrawn from one of the sections, the detent mechanism being operable to prevent and allow movement of the pin.

46. A connector according to claim 45 wherein the detent mechanism comprises a detent ball moveable between a protruding position and a retracted position and an operating mechanism for moving the detent ball to its retracted position and wherein one of the sections includes a surface extending generally transversely with respect to an axis of the pin, the detent ball engaging the transverse surface when the pin is in its latched position.

47. A connector according to claim 46 wherein the pin includes a surface extending generally transversely with respect to the axis of the pin, the retaining member abutting the transverse surface of the pin when the pin is in its unlatched position.

48. A connector according to claim 47 wherein the retaining member comprises a ring surrounding the pin.

49. A connector for connecting equipment to an underwater cable comprising:

14 an inner race having a bore for receiving an underwater cable; and an outer race rotatably mounted around the inner race and comprising first and second semicylindrical sections and first and second hinges each pivotably connecting the first and second sections and spaced from each other in a circumferential direction of the outer race, each hinge comprising a first socket connected to the first section, a second socket connected to the second section, and a hinge pin axially movable between a locked position in which the hinge pin engages the first and second sockets and a retracted position in which the hinge pin is withdrawn from the second socket, the hinge pin including a detent mechanism operable to engage and disengage from the second socket to prevent and allow axial movement of the hinge pin.

50. A connector according to claim 49 wherein each hinge includes a retaining member engageable with the hinge pin to prevent complete detachment of the hinge pin when the hinge pin is in its retracted position.

51. A connector according to claim 5 wherein each detent mechanism comprises a detent ball moveable between a protruding position and a retracted position and an operating mechanism for moving the detent ball to its retracted position and wherein each section includes a surface extending generally transversely with respect to an axis of the hinge pin, the detent ball engaging with the transverse surface when the hinge pin is in its locked position.

52. A connector according to claim 51 wherein each hinge pin includes a surface extending generally transversely with respect to the axis of the hinge pin, the retaining member abutting the transverse surface of the hinge pin when the hinge pin is in its retracted position.

53. A connector according to claim 52 wherein each retaining member comprises a ring surrounding the hinge pin.

54. A connector for connecting equipment to an underwater cable comprising:

a cylindrical inner race having a bore for receiving an underwater cable; and an outer race rotatably mounted around the inner race and comprising first and second sections and a pin detachably connecting the first and second sections and slidably supported by the outer race for movement in an axial direction of the pin between a latched position preventing relative movement of the first and second sections and an unlatched position allowing relative movement of the first and second sections to permit the outer race to be removed from the inner race.

55. A connector according to claim 54 wherein the first and second sections are hingedly connected and the pin comprises a hinge pin.

56. A connector according to claim 54 wherein the pin is movable in an axial direction of the outer race between a latched position in which it prevents the outer race from being opened and an unlatched position in which it allows the outer race to be opened.

57. A connector according to claim 54 wherein the pin includes a detent mechanism releasably engageable with one of the sections and wherein the pin is movable between a latched position in which it prevents the outer race from being opened and an unlatched position in which it allows the outer race to be opened, the detent mechanism being operable to prevent and allow movement of the pin.

58. A connector according to claim 57 wherein the outer race includes a retaining member engageable with the pin to prevent complete detachment of the pin when the pin is in its unlatched position.

59. A connector according to claim 58 wherein the detent mechanism comprises a detent ball moveable between a protruding position and a retracted position and an operating mechanism for moving the detent ball to its retracted position and wherein the outer race includes a surface extending generally transversely with respect to an axis of the pin, the detent ball engaging the transverse surface when the pin is in its latched position.

60. A connector according to claim 59 wherein the pin includes a surface extending generally transversely with respect to the axis of the pin, the retaining member abutting the transverse surface of the pin when the hinge pin is in its unlatched position.

61. A connector according to claim 60 wherein the retaining member comprises a ring surrounding the pin.

62. A connector for connecting equipment to an underwater cable comprising:

a cylindrical inner race; and a cylindrical outer race rotatably mounted about the inner race and comprising a first section, a second section, and first and second removable pins detachably connecting the first and second sections together, each pin being movable in an axial direction of the outer race between a first position in which it engages both the first and second sections and a second position in which it engages only one of the sections.

63. A connector according to claim 62 wherein each pin is a quick release pin.

64. A connector according to claim 62 wherein each pin includes a detent mechanism for releasably engaging the pin with one of the first and second sections.

* * * * *

UNITED STATES PATENT AND TRADEMARK OFFICE
CERTIFICATE OF CORRECTION

PATENT NO. : 5,507,243
DATED : April 16, 1996
INVENTOR(S) : Williams, Jr. et al.

It is certified that error appears in the above-indentified patent and that said Letters Patent is hereby corrected as shown below:

Column 13, Line 35, change "rail" to --race--;

Column 14 Line 20, change "5" to --50--.

Signed and Sealed this

Thirtieth Day of July, 1996

BRUCE LEHMAN

Attest:

Attesting Officer

Commissioner of Patents and Trademarks